Figure 1:
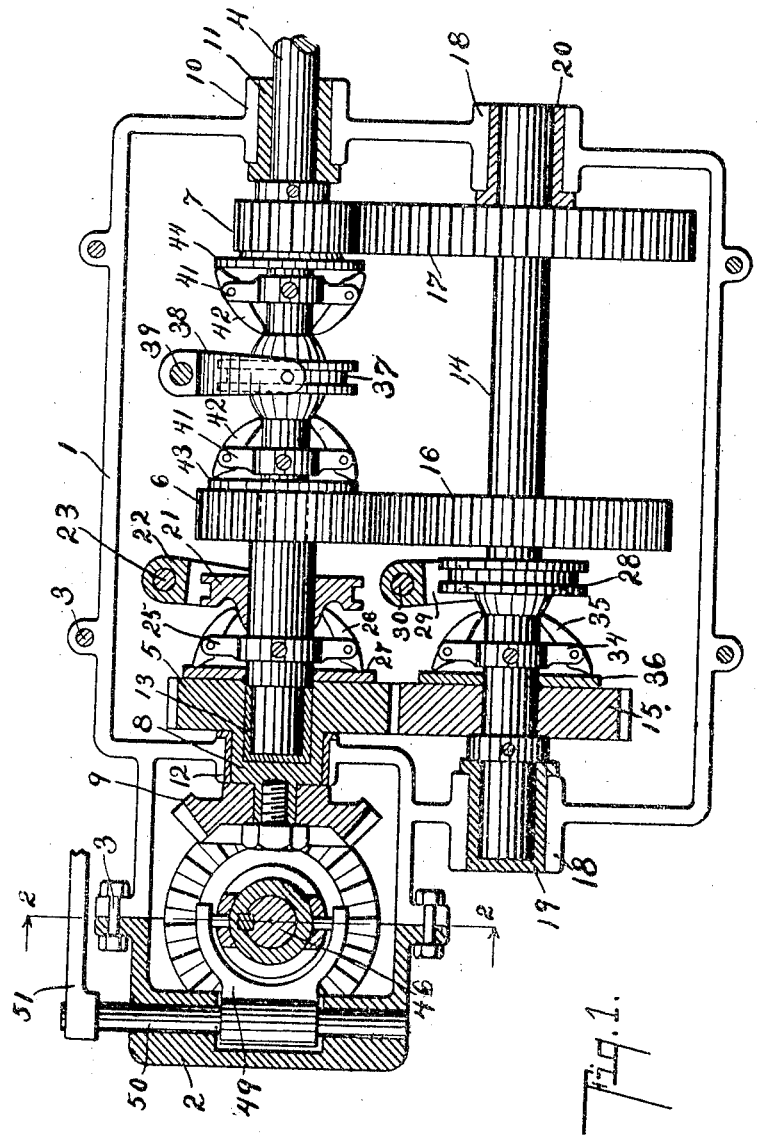

No. 876,355.

PATENTED JAN. 14, 1908.

W. S. HOVEY.
TRANSMISSION GEAR.
APPLICATION FILED APR. 29, 1907.

2 SHEETS—SHEET 1.

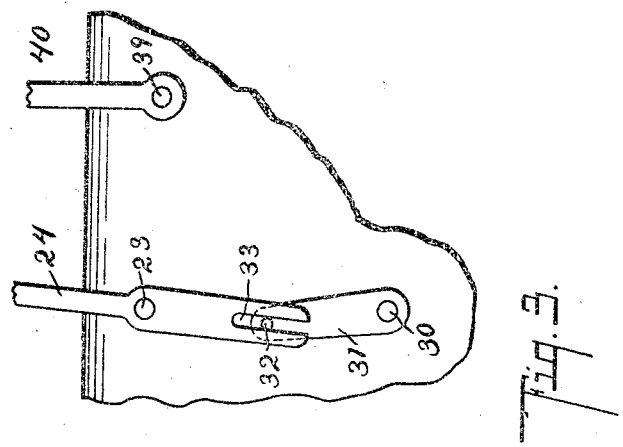
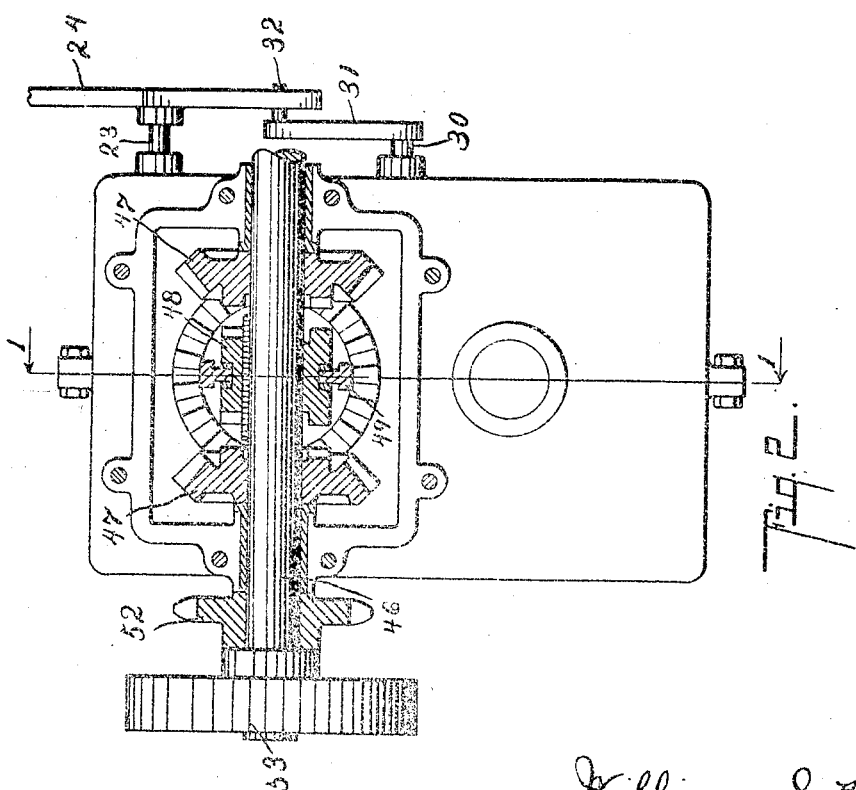

UNITED STATES PATENT OFFICE.

WILLIAM S. HOVEY, OF THREE RIVERS, MICHIGAN, ASSIGNOR TO SHEFFIELD CAR COMPANY, OF THREE RIVERS, MICHIGAN.

TRANSMISSION-GEAR.

No. 876,355.

Specification of Letters Patent.

Patented Jan. 14, 1908.

Application filed April 29, 1907. Serial No. 370,848.

*To all whom it may concern:*

Be it known that I, WILLIAM S. HOVEY, a citizen of the United States, residing at Three Rivers, Michigan, have invented certain new and useful Improvements in Transmission-Gears, of which the following is a specification.

This invention relates to improvements in variable speed transmission and reversing gears.

My improved transmission gear is praticularly designed by me for use in motor vehicles or locomotives, such as are illustrated in my application for Letters Patent, filed on the 18th day of October, 1906, Serial No. 339,534, although it is adapted for use in various other relations.

The main objects of this invention are, first, to provide an improved variable speed and reversing transmission gear by which the vehicle, such as a locomotive or motor vehicle, can be driven in either direction with equal facility; second, to provide an improved variable speed and reversing transmisson gear in which a direct drive may be had, when desired, rather than through the transmission gear; and third, to provide an improved transmission and reversing mechanism which is very simple and economical in structure, and, at the same time, very desirable.

Further objects, and objects relating to details of construction, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing, forming a part of this specification, in which, Figure 1 is a detail of a structure embodying the features of my invention, partially in section on a line corresponding to line 1—1 of Fig. 2; Fig. 2 is a transverse section taken on a line corresponding to the line 2—2 of Fig. 1, showing details of the reversing mechanism; and Fig. 3 is a detail side elevation showing the clutch operating levers and connections therefor.

In the drawing, similar numerals of reference refer to similar parts throughout the several views.

Referring to the drawing, 1 represents a gear casing, it being preferably made up of sections divided on a central line for convenience in assembling the parts. A cap 2 is provided for the casing for the reversing gear. The casing sections are connected by suitable bolts. As clearly appears from the drawing, when the gear casing sections are separated, the shafts may be lifted from their bearings, which are formed half on each casing section.

On the driving shaft 4 are gears 5, 6 and 7, the gears being loosely mounted and adapted to be connected thereto by suitable clutch devices, which will be described later. The gear 5 is provided with a hub-like journal 8, which is arranged in the bearing 12, the journal of the gear forming a bearing for the shaft; a suitable bushing, as 13, being provided for the gear journal. On the end of the journal 8 of the gear 5 is a bevel gear 9. The other end of the driving shaft is supported in a suitable bearing 10, a bushing, as 11, being provided therefor. Arranged parallel with the driving shaft is a second, or driven transmission shaft 14, on which are gears 15, 16 and 17, arranged to mesh with the gears 5, 6 and 7, respectively. The gear 15 is loosely mounted on the shaft, while the gears 16 and 17 are fixed thereto. The transmission shaft 14 is mounted in suitable bearings 18 provided therefor in the gear casing, the bearings being provided with suitable bushings, as 19 and 20; see Fig. 1.

The gear 5 is connected to the driving shaft by means of a clutch mechanism, preferably consisting of the grooved collar 21 slidably mounted on the shaft, the collar being shifted by means of the rock shaft 23 on which is a forked arm 22 adapted to engage the collar. The rock shaft 23 is operated by a suitable lever, as 24. The grooved collar 21 is provided with a conical projection, adapted to act on the dogs 26 to clamp the friction plate 27 against the gear. These dogs are pivoted on the clip 25 secured to the shaft. The gear 15 is clutched to the driven shaft by means of a similar clutch mechanism consisting of the grooved collar 28, the rock shaft 30, and the forked arm 29 adapted to engage the collar. This collar 28 is provided with a conical surface adapted to act on the dogs 35 to clamp the friction plate 36 against the gear. The dogs 35 are pivotally mounted on the clip 34.

On the outer end of the rock shaft 30 is an arm 31, which is connected to the lever 24, the connection preferably consisting of a pin 32 on the arm 31, which is arranged in the slot 33 on the lower end of the lever 24. Through this connection, when one clutch member is thrown into operative position, the other is thrown out, so that, when the gear 5 is clutched to the driving shaft, the gear 15 is released from the transmission shaft, and vice versa. The gears 6 and 7 are provided with a similar clutch member, consisting of the collar 37 having a conical surface on each side to act on the dogs 42 to clamp them into engagement with the friction members 43 and 44. These dogs 42 are mounted on the clip 41 similar to those described.

Arranged transversely of the driving shafts is a driven shaft 46 having beveled gears 47 thereon adapted to mesh with the bevel gear 9. Either of these gears may be secured to the shaft by means of the jawed clutch 48, which is slidably mounted on the shaft. This clutch is operated by the forked arm 49, mounted on the rock shaft 50. This rock shaft is provided with a suitable actuating lever 51. By this arrangement, by shifting the clutch 48, the shaft may be driven in either direction, as desired. This driven shaft 48 is preferably provided with a brake wheel 53, but as the structure of this brake wheel forms no part of this invention, the details are not here illustrated. On the shaft 46 is a suitable sprocket wheel 52 by means of which the shaft may be connected to the part to be driven.

By arranging the parts as I have illustrated and described, I secure three speeds in either direction; that is, the direct driving speed which is had when the gear 5 is clutched to the driving shaft, and two reduced speeds, which are secured by shifting the lever 24, which releases the clutch for the gear 5 and actuates the clutch for the gear 15. The lever 40 may then be shifted to clutch either the gears 6 or 7 to the driving shaft, as desired. To reverse the mechanism, the lever 51 is actuated to clutch one or another of the gears 47 to the driven shaft 46, as may be desired.

My improved transmission and reversing mechanism is simple and compact, and, at the same time, is a very desirable and practical structure.

I have illustrated and described the same in detail in the form preferred by me on account of its structural simplicity and economy. I am, however, aware that it is capable of considerable variation in details of construction without departing from my invention.

Having thus described my invention, what I claim as new and desire to secure by Letters Patent is:

1. The combination of a driving shaft; a gear revolubly mounted thereon; a bevel gear secured thereto; a clutch for securing said gear to said driving shaft; a transmission shaft arranged parallel with said driving shaft; a gear revolubly mounted thereon arranged to mesh with said gear on said driving shaft; a clutch mechanism for securing said gear to said transmission shaft; connections for said clutches whereby, when one is in engagement, the other is released; driving connections for said driving and transmission shafts adapted to be connected or disconnected as desired; a driven shaft arranged transversely of said driving shaft, and driving connections to said bevel gear for the purpose specified.

2. The combination of a driving shaft; a gear revolubly mounted thereon; a bevel gear secured thereto; a clutch for securing said gear to said driving shaft; a transmission shaft arranged parallel with said driving shaft; a gear revolubly mounted thereon arranged to mesh with said gear on said driving shaft; a clutch mechanism for securing said gear to said transmission shaft; and driving connections for said driving and transmission shafts adapted to be connected or disconnected as desired, for the purpose specified.

In witness whereof, I have hereunto set my hand and seal in the presence of two witnesses.

WILLIAM S. HOVEY. [L. S.]

Witnesses:
F. C. B. SCHOOMAKER,
J. P. McKEY.